US012570468B2

(12) United States Patent
Becker et al.

(10) Patent No.: US 12,570,468 B2
(45) Date of Patent: Mar. 10, 2026

(54) STACKING STORAGE ARRANGEMENT

(71) Applicant: Jungheinrich Aktiengesellschaft, Hamburg (DE)

(72) Inventors: Michael Becker, Hainburg (DE); Anatolij Alberg, Pfungstadt (DE); Marc Gerhardt, Hünfeld (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 412 days.

(21) Appl. No.: 18/115,465

(22) Filed: Feb. 28, 2023

(65) Prior Publication Data

US 2023/0278790 A1 Sep. 7, 2023

(30) Foreign Application Priority Data

Mar. 3, 2022 (EP) ..................................... 22159995

(51) Int. Cl.
 *B65G 1/04* (2006.01)
 *F16B 2/06* (2006.01)
 *F16B 7/04* (2006.01)
(52) U.S. Cl.
 CPC .............. *B65G 1/0471* (2013.01); *F16B 2/06* (2013.01); *F16B 7/044* (2013.01); *F16B 2200/30* (2018.08); *Y10T 403/4602* (2015.01)
(58) Field of Classification Search
 CPC ........... B65G 1/0471; E04B 2001/2415; E04B 2001/2424; F16B 2/06; F16B 2/065; F16B 7/044; F16B 7/0473; F16B 7/048; F16B 7/0486; F16B 2200/30; F16B 2200/40; Y10T 403/46; Y10T 403/4602; Y10T 403/7105; Y10T 403/7123; Y10T 403/7158

USPC ..................................................... 403/256, 257
See application file for complete search history.

(56) References Cited

U.S. PATENT DOCUMENTS

| | | | | |
|---|---|---|---|---|
| 4,007,993 A | * | 2/1977 | Schwartz ................ | F16B 2/065 |
| | | | | 285/125.1 |
| 4,864,795 A | * | 9/1989 | Burg ........................ | F16B 12/40 |
| | | | | 403/312 |
| 5,116,161 A | * | 5/1992 | Faisst ...................... | F16B 7/187 |
| | | | | 403/231 |

(Continued)

FOREIGN PATENT DOCUMENTS

| | | |
|---|---|---|
| EP | 3 782 928 | 2/2021 |
| EP | 3 782 930 | 2/2021 |
| GB | 2 456 877 | 8/2009 |

OTHER PUBLICATIONS

Europe Search Report/Office Action conducted in counterpart Europe Appln. No. 22159995.4 (Sep. 5, 2022).

*Primary Examiner* — Amber R Anderson
*Assistant Examiner* — Kevin J Baynes
(74) *Attorney, Agent, or Firm* — GREENBLUM & BERNSTEIN, P.L.C.

(57) ABSTRACT

Stacking storage arrangement including at least one container receiving space; a loading space which is arranged below the container receiving space; a frame assembly between the container receiving space and the loading space; and an upright on at least one corner of the container receiving space, which is connected to the frame assembly by at least one connecting device. The connecting device bridges an angle between the frame assembly and the upright and abuts the frame assembly in a clamping manner.

14 Claims, 2 Drawing Sheets

(56)                    References Cited

U.S. PATENT DOCUMENTS

| | | | | |
|---|---|---|---|---|
| 5,715,643 | A * | 2/1998 | Parkinson | B62D 27/026 |
| | | | | 403/231 |
| 6,565,279 | B1 * | 5/2003 | Skovronski | F16B 2/065 |
| | | | | 403/231 |
| 8,414,068 | B1 * | 4/2013 | Na | B62D 27/023 |
| | | | | 296/193.06 |
| 8,961,060 | B2 * | 2/2015 | Oetlinger | F16B 7/187 |
| | | | | 403/231 |
| 9,003,981 | B2 * | 4/2015 | Lio | F16B 12/40 |
| | | | | 108/157.1 |
| 9,200,443 | B2 * | 12/2015 | Marple | F16B 7/00 |
| 9,228,342 | B2 * | 1/2016 | Lewcock | E04B 2/7455 |
| 10,415,616 | B2 * | 9/2019 | Nehls | F16M 13/022 |
| 2009/0000235 | A1 | 1/2009 | Kieran et al. | |
| 2021/0052071 | A1 | 2/2021 | Cavelius et al. | |
| 2021/0053777 | A1 | 2/2021 | Harting et al. | |

* cited by examiner

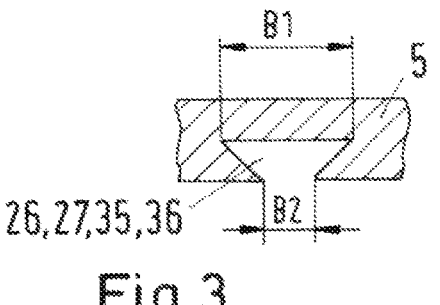
Fig.2
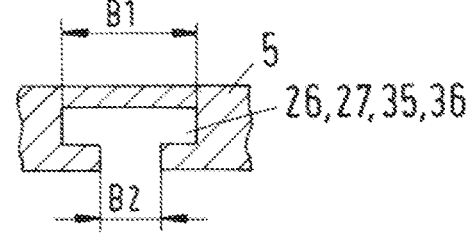
Fig.3
Fig.4

STACKING STORAGE ARRANGEMENT

CROSS-REFERENCE TO RELATED APPLICATION

This application claims priority under 35 U.S.C. § 119 (a) to Europe Application No. 22 15 9995.4 filed Mar. 3, 2022, the disclosure of which is expressly incorporated by reference herein in its entirety.

BACKGROUND

1. Field of the Invention

Embodiments are directed to a stacking storage arrangement having at least one container receiving space and a loading space, which is arranged below the container receiving space, a frame assembly between the container receiving space and the loading space, and an upright, on at least one corner of the loading space, which is connected to the frame assembly by at least one connecting device.

2. Discussion of Background Information

Such a stacking storage arrangement is known, for example, from EP 3 782 930 A1. Such a stacking storage arrangement serves to accommodate a large number of containers. The containers are stacked. Each stack is then arranged in a container receiving space.

In the present invention, the loading of a container into the container receiving space and the removal of a container from the container receiving space takes place from below through the loading space. During the loading of a container, a loading vehicle is used to move a container through the loading space into a position which is located below the container receiving space. The container is then raised until it enters the container receiving space. If a container (or a stack of containers) is already arranged in the container receiving space, the container or container stack already located in the container receiving space is raised when the container is raised, so that a stack of two or more containers is located therein. This stack is then deposited on a holding arrangement which is often arranged on the frame assembly.

In order to ensure lateral stability of the stack of containers, an upright is arranged on at least one corner of the container receiving space. In many cases, such an upright is located at each corner or at diagonally opposite corners of the container receiving space. The upright must be oriented vertically. It can, for example, stand upright on the frame assembly. Often, adjacent uprights are also connected to one another at a certain distance from the frame assembly by additional transverse braces.

SUMMARY

Embodiments enable a stable alignment of the upright with respect to the frame assembly in a simple manner.

According to embodiments, a stacking storage arrangement of the type mentioned at the outset includes a connecting device bridging an angle between the frame assembly and the upright and abutting the frame assembly in a clamping manner.

With such a connecting device, a triangle is produced in the region between the upright and the frame assembly, which triangle practically cannot be deformed. The mounting of the connecting device is relatively simple. The connecting device is clamped against the frame assembly, i.e., it is not necessary to guide joining elements through bores in the connecting device and the frame assembly. This greatly simplifies the assembly of the connecting device. The production of the frame assembly and its parts is also greatly simplified. They can be produced, for example, by casting. Complex post-processing is not necessary. The racks can be reliably connected to the frame in a simple manner.

Preferably, the frame assembly for each connecting device has a recess in which the connecting device engages. Such a recess can already be formed during production of the frame assembly. In addition to the clamping connection, the recess also allows a certain positive fit between the connecting device and the frame assembly. Accordingly, the clamping force required for the clamping connection can be kept relatively small.

The connecting device preferably engages around a part of the frame assembly in a U-configuration. The connecting device can, for example, rest against a top side of the frame assembly and simultaneously engage in the recess.

Preferably, the frame assembly has beams. The recess is designed as a through-opening in a beam which is connected to an angle element, and a joining element that connects the beam to the angle element is accessible via the through-opening. The recess formed as a through-opening can then be used simultaneously to mount joining elements which connect the beam to the angle element.

Preferably, the connecting device has two connecting elements which abut a region of the frame assembly from opposite sides. The use of two connecting elements facilitates assembly. The two connecting elements must be arranged only on both sides of the frame assembly and then braced against each other.

Preferably, the connecting elements are braced against the frame assembly via at least one threaded pin. A threaded pin is a known joining element, which can easily be used for bracing the connecting elements against the frame assembly. For this purpose, it is only necessary to place aligned bores in the two connecting elements, through which bores the threaded pin can be guided. Further machining frequently is not necessary.

Preferably, the upright has a rail arrangement in which the connecting device engages. The rail arrangement enables a certain mobility of the connecting device along the upright, so that an adjustment of the connecting device in the direction of gravity, i.e., along the longitudinal extension of the upright, can be achieved in a simple manner.

It is preferred here that the rail arrangement has a dovetail profile and the connecting device have a counter profile that fits therewith. A dovetail profile enables on the one hand a movement of the connecting device along the upright. By contrast, a movement of the connecting device transversely thereto, i.e., out of the rail arrangement, is prevented. A dovetail profile is intended as the profile used in which the counter profile in the interior of the upright has a greater width transverse to a displacement direction than further outside.

Preferably, the rail arrangement has two profiles with which the connecting device is connected. This is particularly expedient when the connecting device has two connecting elements. In this case, each connecting element can be arranged in a profile of the rail arrangement. The two connecting elements can then be mounted separately from one another, which facilitates assembly. They can also each be individually aligned-specifically such that they can interact in the desired manner.

Preferably, the connecting device has at least one threaded pin which braces the connecting device with respect to the rail arrangement. This also produces a clamping force between the connecting device and the upright. After the connecting device is braced with respect to the rail arrangement, a movement of the connecting device with respect to the upright is excluded.

Preferably, the connecting device has at least one first threaded pin, which braces the connecting device with respect to the frame assembly, and at least one second threaded pin, which braces the connecting device with respect to the rail arrangement. Thus, the bracing of the connecting device with respect to the rail arrangement, i.e., with respect to the upright, and with respect to the frame assembly can be decoupled. This in turn facilitates installation.

Preferably, the frame assembly has at least two frame elements with different thicknesses, wherein the connecting device has at least two different clamping regions matched to the different thicknesses. In many cases, the container is equipped with a rectangular floor plan in the container receiving space. Accordingly, it is expedient to also form the container receiving space with a rectangular horizontal cross-section. The frame assembly then has first frame elements on the longitudinal side and second frame elements on the transverse side of the rectangular outline. The second frame elements, which have a shorter length and a somewhat greater thickness than the first frame elements on the longitudinal side, can then be formed on the transverse side. If the connecting device then has two different clamping regions matched to the different thicknesses, the same type of connecting devices can be used both for the connection of the upright to the first frame elements and for the connection of the upright to the second frame elements. Thus, only a single type of connecting device is required. This also saves on costs.

In this case, it is preferred that the clamping regions be formed by recesses of different depths in the connecting device. Each recess can then comprise a region of the frame assembly, i.e., either a region of the first frame elements or a region of the second frame elements, in a U-configuration.

It is preferred here that the clamping regions be arranged offset along the connecting device. This just means that the connection between the connecting device and the upright takes place as a function of the desired clamping region at different height positions, i.e., positions in the direction of gravity or along the extension of the upright.

The connecting device is preferably formed with zinc or aluminum die casting as a main component. During the die casting of zinc or aluminum elements, all contours of the connecting elements can be produced. The elements of the frame assembly can also be designed as cast parts.

Embodiments are directed to a stacking storage arrangement that includes at least one container receiving space: a loading space which is arranged below the container receiving space; a frame assembly between the container receiving space and the loading space; and an upright on at least one corner of the container receiving space, which is connected to the frame assembly by at least one connecting device. The connecting device bridges an angle between the frame assembly and the upright and abuts the frame assembly in a clamping manner.

According to embodiments, the frame assembly for each connecting device can have a recess in which the connecting device engages. The connecting device may engage around a part of the frame assembly in a U-shaped manner. Moreover, the frame assembly may have beams, the recess can be formed as a through-opening in a beam which is connected to an angle element, and a joining element, which can connect the beam to the angle element, may be accessible via the through-opening.

In accordance with embodiments, the connecting device can have two connecting elements which abut a region of the frame assembly from opposite sides. The connecting elements may be braced against the frame assembly by at least one threaded pin.

In other embodiments, the upright may have a rail arrangement in which the connecting device engages. The rail arrangement can have a dovetail profile, and the connecting device can have a mating profile that fits in the dovetail profile. The rail arrangement may have two dovetail profiles to which the connecting device is connected. Further, the connecting device can have at least one threaded pin which braces the connecting device with respect to the rail arrangement. The connecting device may have at least one first threaded pin, which braces the connecting device with respect to the frame assembly, and at least one second threaded pin, which braces the connecting device with respect to the rail arrangement.

According to still other embodiments, the frame assembly may have at least two beams with different thicknesses and the connecting device can have at least two different thicknesses matched to different clamping regions. The clamping regions may be formed by recesses of different depths in the connecting device. The clamping regions can be arranged offset along the connecting device.

In accordance with still yet other embodiments, the connecting device may be formed with zinc or aluminum die casting as a main component.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with a drawing. The following are shown therein:

FIG. 2 is an enlarged view of a position at which an upright is connected to a frame assembly;

FIG. 3 is a schematic representation of a profile of a rail arrangement; and

FIG. 4 is a modified embodiment of FIG. 3.

DETAILED DESCRIPTION

Figure 1:
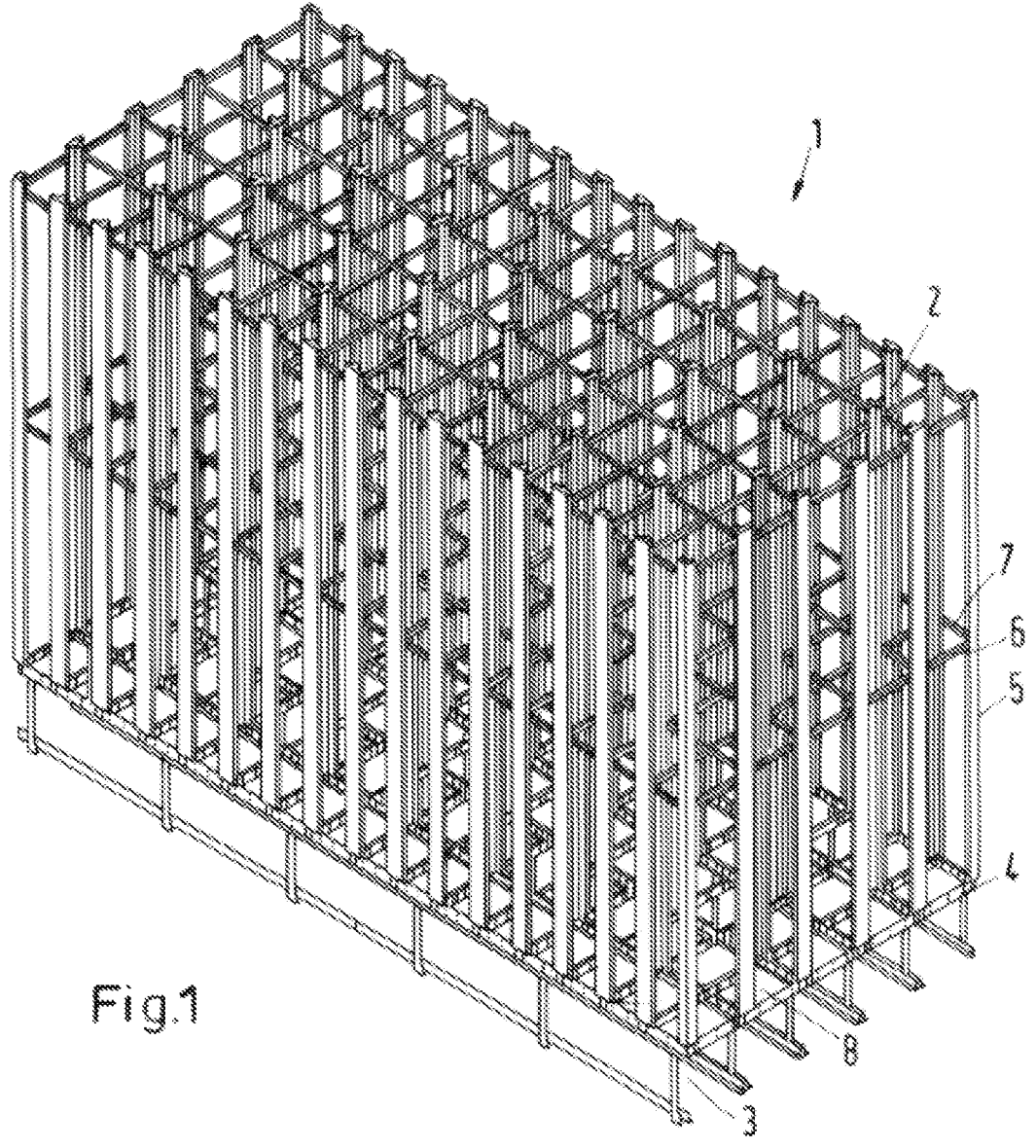
FIG. 1 is a schematic representation of a stacking storage arrangement.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a stacking storage arrangement 1 very schematically, i.e., without further details, with several container receiving spaces 2 and a loading region 3, which is arranged below the container receiving spaces 2.

A frame arrangement 4 is arranged between the container receiving spaces 2 and the loading space 3. On the frame assembly 4, uprights 5 are arranged which are connected to one another, spaced apart from the frame assembly 4, by transverse braces 6 and longitudinal braces 7.

For each container receiving space 2, the frame assembly 4 has an opening 8 through which the container receiving space 2 is connected to the loading space 3.

In the present case, uprights 5 are arranged at each corner of the container receiving spaces 2. However, this is not absolutely necessary.

The container receiving spaces 2 serve to accommodate one container stack each, wherein a container stack has at least one container. Stable storage of the container stacks is achieved, on the one hand, by a horizontal alignment of the frame assembly 4 and, on the other, by a vertical alignment of the uprights 5. The uprights 5 have to be connected to the frame assembly 4 in a stable and exactly aligned manner. FIG. 2 shows the elements used for this purpose.

Identical elements are provided with the same reference signs in all figures.

In the present case, the frame assembly 4 has longitudinal members 9 and cross members 10. The longitudinal members 9 are longer than the cross members 10 and have a somewhat smaller thickness than the cross members 10. The longitudinal members 9 and the cross members 10 are each connected to an angle element 11. In the present case, a holding flap (or pawl) 12 is arranged on the angle element 11 so as to be pivotable about a horizontal axis. The holding flap 12 serves to hold the lowermost container of a stack of containers or a single container in the container receiving space 2 so that the loading space 3 remains free below the container receiving space 2.

The longitudinal member 9 has two recesses formed as through-openings 13, 14. A joining element 15, 16 in the form of a screw is arranged in each of these through-openings 13, 14, wherein the screws 15, 16 connect the longitudinal member 9 to the angle element 11.

In the same way, the cross member 10 has two recesses formed as through-openings 17, 18. A joining element designed as a screw 19, 20 is arranged in each through-opening 17, 18 and connects the cross member 10 to the angle element 11.

A connection between the upright 5 and the cross member 9 of the frame assembly 4 is brought about by a connecting device 21, which in the present case has two connecting elements 23, 24. The upright 5 has a rail arrangement 25 with two profiles 26, 27, wherein each of the two connecting elements 23, 24 engages in one of the profiles 26, 27. Each of the profiles 26, 27 enables a displacement of the respective connecting element 23, 24 in the longitudinal direction of the upright 5, but prevents the respective connecting element 23, 24 from being pulled out of the upright 5 transversely to the longitudinal direction. The profiles 26, 27, of which two possible embodiments are shown by way of example in FIGS. 3 and 4, have a width B1 in the interior of the upright, which width is greater than a width B2 at which the connecting elements 23, 24 are led out of the upright 5. For the sake of simplicity, the profiles 26, 27 are collectively referred to as "dovetail profiles," even if, for example, the profile shown in FIG. 4 is similar to a "hammer head." It is also possible to design the arrangement such that the projection is arranged on the upright 5, and the groove is arranged on the connecting elements 23, 24.

The two connecting elements 23, 24 are of mirror-symmetrical design. Each connecting element 23, 24 has a recess 28 in the region of the longitudinal member, which recess engages around a region of the longitudinal member 9 between the recess 13 and the top side 29 of the longitudinal member 9 in a U-configuration. The connecting elements 23, 24 also have a second recess 30, which is described in connection with the cross member 10.

The two connecting elements 23, 24 are connected to one another by a first threaded pin 31, which braces the two connecting elements 23, 24 with respect to the longitudinal beam 9, i.e., it generates a clamping force between the connecting device 21 and the longitudinal beam 9. Furthermore, the connecting elements 23, 24 are connected to one another by a second threaded pin 32 which braces the connecting elements 23, 24 with respect to the rail arrangement 25 and thus with respect to the upright 5.

For assembly, the two connecting elements 23, 24 are inserted into the profiles 26, 27 of the rail arrangement 25, e.g., from an end face of the upright 5, and then displaced in the longitudinal direction of the upright 5 until the recesses 28 can engage around the corresponding region of the cross member 9 between the recess 13 and the top side 9. The two threaded pins 31, 32 are then used to brace the two connecting elements 23, 24 against one another in one direction. In this way, the connecting device 21 is fixed between the upright 5 and the longitudinal member 9 and ensures that the upright 5 is oriented at the desired angle to the longitudinal member 9. This angle is ideally exactly 90°.

Arranged between the upright 5 and the cross member 10) is a further connecting device 33, which is constructed in the same way as the connecting device 21. For the connecting device 33, the upright has a rail arrangement 34 with two profiles 35, 36. The connecting device has two connecting elements 37, 38, each of which engages in one of the profiles 35, 36 of the rail arrangement 34. The profiles 35, 36 are designed in the same way as the profiles 26, 27 of the rail arrangement 25.

The connecting elements 37, 38 are designed to be mirror-symmetrical and have, in the region of the cross member 10, the recess 30, which has been described in connection with the connecting elements 23, 24. The recess 30 is arranged along the connecting device 33, offset with respect to the recess 28. The recess 30 has a greater depth than the recess 28. This takes account of the fact that the cross member 10 has an increased thickness relative to the longitudinal member 9. Accordingly, the profiles 35, 36 of the rail arrangement 34 can be at the same distance from one another as the profiles 26, 27 of the rail arrangement 25.

The connecting elements 37, 38 are mounted in the same way as the connecting elements 23, 24. The connecting elements 37, 38 are brought into engagement with the profiles 35, 36 on the upright 5 and can then be displaced along the longitudinal extension of the upright 5, and, in particular, until the recess 30 can encompass a region between the recess 17 of the cross member 10 and a top side 39 of the cross member 9 in a U-configuration. As soon as this has been achieved, and the upright 5 has been aligned with respect to the cross member 10 at the desired angle (in the ideal case, this angle is also) 90°, two threaded pins 40, 41 can be used to brace the connecting elements 37, 38 with respect to the cross member 10, on the one hand, and with respect to the rail arrangement 34, on the other. Because the recesses 13, 14; 17, 18 are designed as elongated recesses, the recesses 30 of the connecting device 33 and the recesses 28 of the connecting device 21 can be arranged at different distances from the upright 5 without impairing the stability of the connection between the upright 5 and the frame assembly 4 with the longitudinal member 9 and the cross member 10.

The upright 5 can be designed as a profile element, which is produced, for example, by extrusion. In this manufacturing process, the rail arrangements 25, 34 can be co-produced at the same time.

The longitudinal member 9 and the cross member 10 can be formed as sheets of iron or another material having a thickness in the range of 5 mm to 35 mm, in which the recesses 13, 14, 17, 18 can be produced by punching. The connecting elements 23, 24, 37, 38 can be designed as zinc or aluminum die-cast parts. Only the two threaded pins 31, 32; 40, 41 require, if necessary, the production of suitable bores or holes, wherein these bores or holes can already be produced during casting of the connecting elements 23, 24, 37, 38.

Overall, a connection between the upright 5 and the frame assembly 4 is made possible with few parts and with little effort in a secure manner.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A stacking storage arrangement comprising:
at least one container receiving space;
a loading space which is arranged below the container receiving space;
a frame assembly between the container receiving space and the loading space; and
an upright on at least one corner of the container receiving space, which is connected to the frame assembly by at least one connecting device,
wherein the connecting device bridges an angle between the frame assembly and the upright and abuts the frame assembly in a clamping manner,
wherein the frame assembly has at least two beams with different thicknesses, and wherein the connecting device has at least two clamping regions matched to the different thicknesses.

2. The stacking storage arrangement according to claim 1, wherein the frame assembly has a recess for each connecting device, in which recess the connecting device engages.

3. The stacking storage arrangement according to claim 2, wherein the connecting device engages around a part of the frame assembly in a U-shaped manner.

4. The stacking storage arrangement according to claim 2, wherein the frame assembly has beams, the recess is formed as a through-opening in a beam which is connected to an angle element, and a joining element, which connects the beam to the angle element, is accessible via the through-opening.

5. The stacking storage arrangement according to claim 1, wherein the connecting device has two connecting elements which abut a region of the frame assembly from opposite sides.

6. The stacking storage arrangement according to claim 5, wherein the connecting elements are braced against the frame assembly by at least one threaded pin.

7. The stacking storage arrangement according to claim 1, wherein the upright has a rail arrangement in which the connecting device engages.

8. The stacking storage arrangement according to claim 7, wherein the rail arrangement has a dovetail profile, and the connecting device has a mating profile that fits in the dovetail profile.

9. The stacking storage arrangement according to claim 7, wherein the rail arrangement has two dovetail profiles to which the connecting device is connected.

10. The stacking storage arrangement according to claim 7, wherein the connecting device has at least one threaded pin which braces the connecting device with respect to the rail arrangement.

11. The stacking storage arrangement according to claim 10, wherein the connecting device has at least one second threaded pin, which braces the connecting device with respect to the frame assembly.

12. The stacking storage arrangement according to claim 1, wherein the clamping regions are formed by recesses of different depths in the connecting device.

13. The stacking storage arrangement according to claim 1, wherein the clamping regions are arranged offset along the connecting device.

14. The stacking storage arrangement according to claim 1, wherein the connecting device is formed with zinc or aluminum die casting as a main component.

\* \* \* \* \*